United States Statutory Invention Registration [19]

[11] Reg. Number: H777

Natarajan [43] Published: May 1, 1990

[54] METHOD FOR JET GAS IMPINGEMENT QUENCHING

[75] Inventor: Mani Natarajan, Perrysburg, Ohio

[73] Assignee: The United States of America as represented by the Secretary of the Air Force, Washington, D.C.

[21] Appl. No.: 51,420

[22] Filed: May 19, 1987

[51] Int. Cl.[5] ..... C21D 1/54

[52] U.S. Cl. ..... 148/128; 148/146; 266/81; 266/114; 266/134

[58] Field of Search ..... 148/128, 143, 146, 13.1; 266/81, 114, 134

[56] References Cited

U.S. PATENT DOCUMENTS

| | | | |
|---|---|---|---|
| 3,962,799 | 6/1976 | Lapointe et al. | 34/54 |
| 4,440,584 | 4/1984 | Takeshige et al. | 148/128 |
| 4,610,435 | 9/1986 | Pfau et al. | 266/250 |
| 4,634,103 | 1/1987 | Schmetz et al. | 266/80 |
| 4,653,732 | 3/1987 | Wunning et al. | 266/259 |

*Primary Examiner*—Stephen J. Lechert, Jr.

*Attorney, Agent, or Firm*—Thomas L. Kundert; Donald J. Singer

[57] ABSTRACT

Method and apparatus is provided for quenching a metal workpiece by an inert gas at ambient temperature. Jet streams of gas coolant at high velocity and flow rates are directed in a balanced arrangement against opposing workpiece sides and the jets are correlated to the thickness of the workpiece sections to achieve uniform cooling rates with minimal workpiece distortion. A flow straightening grid in combination with a variable sized aperture plate achieves the desired jet streams in an adjustable plenum arrangement which directs the streams against the top and bottom surfaces of the workpiece.

6 Claims, 5 Drawing Sheets

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

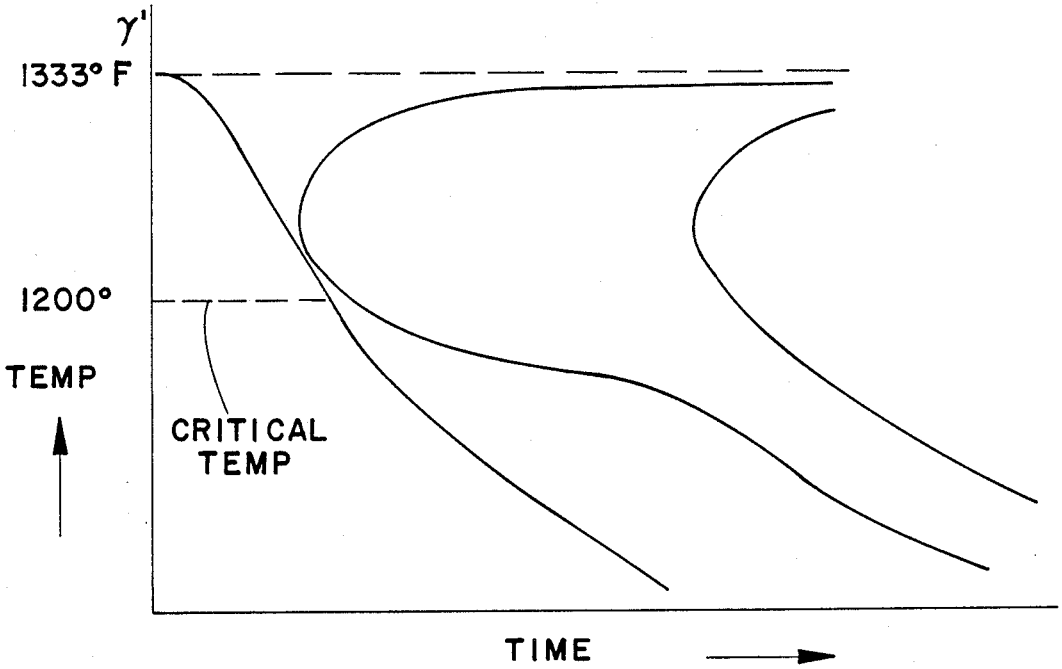
FIG. 6
FIG. 7
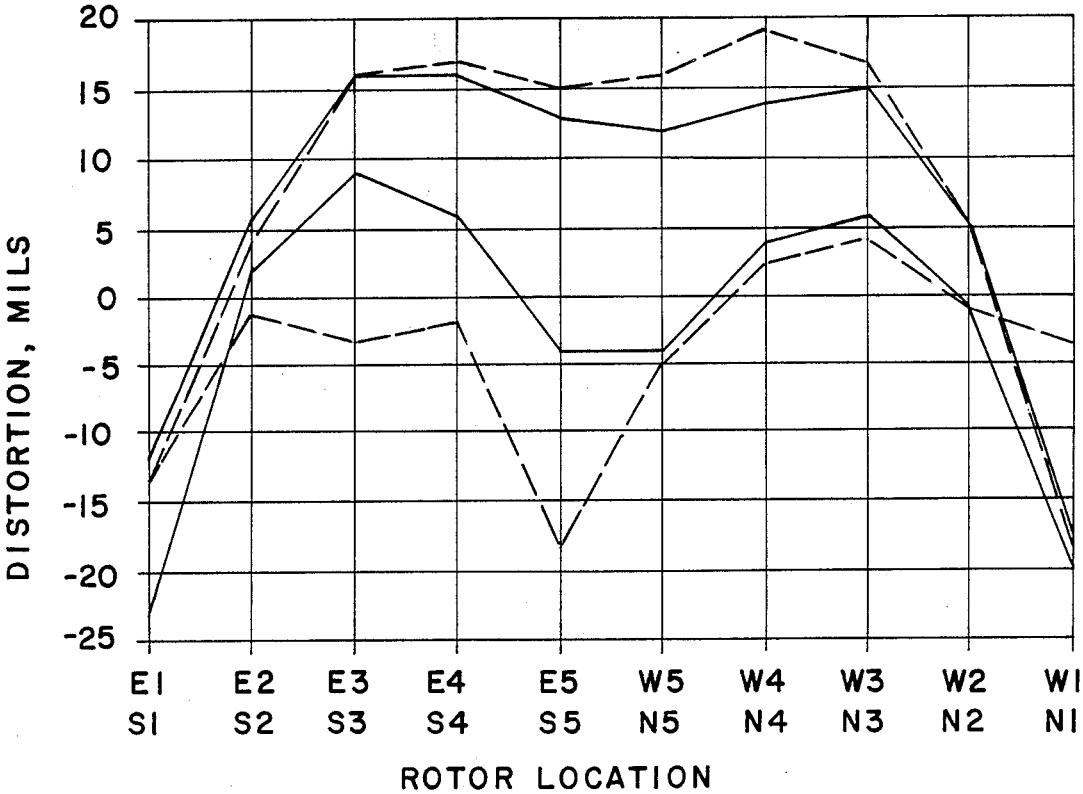

METHOD FOR JET GAS IMPINGEMENT QUENCHING

This invention was made with Government support under Contract No. F 33615-85-C-5152 awarded by the U.S. Air Force and more specifically by a subcontract awarded the assignee under the aforementioned contract. The Government has certain rights under this invention.

BACKGROUND

This invention relates to a method and apparatus for quenching a metal workpiece by means of jet gas impingement and, more particularly, to a balanced jet gas impingement cooling arrangement which promotes uniform cooling and minimum distortion.

The invention is particularly applicable to a method and apparatus used to quench at a critical cooling rate a super-alloy workpiece having varying thick-thin sections throughout its length and will be described with particular reference thereto. However, the invention is applicable to any configured metal workpiece which must be quenched at a critical cooling rate while being maintained during and after the quench within close dimensional tolerances.

In the heat treatment of metals a wide variety of cooling arrangements have been utilized to achieve uniform cooling of the entire surface of the workpiece which, in turn, results in uniform grain growth and minimal workpiece distortion. When quenching is desired, certain liquid quenches have varied the flow of liquid coolant as between the top surface of the work and the bottom surface of the work, or as between the center of the work and the edge of the work, or to provide additional liquid coolant between adjacent workpieces to compensate for the radiation heat therebetween. In those heat treating applications where the work is to be cooled but not quenches such as where the work is to be furnace cooled or tempered, or normalized, etc., it is known that improved results can be obtained by impinging thick work sections with streams of gas coolant to achieve somewhat similar cooling rates between the thick sections of the workpiece as well as the thin sections of the piece. Additionally, workpieces have been cooled by a gas coolant directed at one part of the workpiece and a liquid coolant at another part to achieve differential hardening of the workpiece. In the other instances, liquid droplets have been interspersed with gas coolant and the resulting mist spray has been impinged against the workpiece to achieve a controlled cooling rate which is more severe than gas cooling but less drastic than liquid quenching.

As a general proposition, quenching of steel workpieces at or in excess of critical cooling rate has heretofore been accomplished by means of a liquid coolant. For definitional purposes, quenching will be defined as rapid cooling of a workpiece which has been heated to a temperature or at above its upper critical temperature limit (i.e. for plain carbon steels the temperature, 1333° F., whereat the steel undergoes a phase transformation, in that body centered cubic crystals change to face centered cubic crystals and for superalloy steels, the temperature whereat $Ni_3(Al, Ti)$ is precipitated in a face centered cubic crystal, i.e. $\gamma'$) to a temperature below the "knee" of the workpiece's isothermal transformation or T-T-T curve. Cooling at the critical rate means quenching the workpiece at a cooling rate which is sufficient to cool the workpiece without the workpiece passing through the "knee" of the transformation curve. As noted, when the end user specifications indicate that the workpiece be quenched, liquid quenches either in the form of spray nozzles have been traditionally employed to achieve the desired cooling rate, or when quench cracking tends to occur, salt or oil bath liquid quenches maintained at an elevated temperature have been employed. While many of the liquid cooling arrangements discussed above have attempted to control the manner in which the workpiece is exposed to the liquid coolant to promote uniform cooling of the workpiece, inherent in any liquid coolant arrangement is the vapor barrier which results when the metal contacts the liquid coolant. The presence of the vapor barrier and the attempts to control the size of the barrier during cooling of the workpiece present significant problems if the workpiece tolerances are extremely close.

In applications requiring close workpiece tolerances, entirely different heat treat approaches have had to be resorted to. If the heat treated part was to be used in either a rolling or sliding manner with another part, such as in a gear or cam application, case hardening of only the surface of the part is affected. In extremely tight tolerance applications, plasma arc heating or induction heating has been employed to minimize the machine finishing operations to be subsequently used. In other applications, particularly in the aerospace field, where through hardness and close workpiece tolerances must be obtained, complicated manufacturing processes have had to be employed. Generally, superalloy steels have had to be employed to arrive at a suitable T-T-T curve where a critical cooling rate could be obtained by a moderate quench which would not produce quench cracks while permitting uniform grain structures throughout. Different thick-thin components of the part would be separately formed and heat treated so that large variations in gain size would not occur and thick and thin parts would then be welded together to produce the composite part which would subsequently be annealed or tempered to stress relieve the junctions of the welded part. This, in fact, was the manufacturing process heretofore used in the manufacture of the workpiece illustrated in the preferred embodiment of this invention. The workpiece disclosed is a rotor for use in jet engines. Prior to the present invention, the hub was forged separately and apart from the blades or fins with each fin individually welded to the hub after quenching. The entire rotor was then subjected to a stress relieving heat treatment. This process was necessitated because the rotor blades would deform outside part tolerances if the rotor was formed as a one-piece assembly and quenched to achieve its through hardness requirements. However, when the workpiece was manufactured from a composite structure, it was found that the junction of the component pieces is typically the weakest link in the part and has a finite life less than that which otherwise might be achieved.

SUMMARY OF THE INVENTION

Accordingly, it is a principle object of this invention to provide a gas quench arrangement which achieves a critical cooling rate with minimal distortion of the workpiece.

This object is achieved by method and apparatus which is particularly suited for quenching a longitudinally extending workpiece which has at least one thick and one thin section extending over discrete portions of the workpiece. A first structural arrangement is provided for impinging a coolant gas substantially normal to and over an area which circumscribes and encompasses the thick section of the workpiece on both sides thereof. A second structural arrangement is provided for impinging a coolant gas substantially normal to and over an area which encompasses a thin section of the workpiece. Contained within each arrangement is a plurality of discrete, closely spaced, substantially columnar jets of cooling gas at substantially ambient temperature. By correlating the velocity and mass flows of the jets within each arrangement, both sections of the workpiece are cooled at the same rate which can substantially equal the critical cooling rate to minimize workpiece distortion.

In accordance with another aspect of the invention, the workpiece is supported within an enclosed chamber where the workpiece has been conveyed after it has been through heated to a temperature at or slightly above its upper critical temperature. Spaced a predetermined, closedly controlled distance from the top surface of the workpiece is a first or top cooling plate which has an area that is aligned with and extends over the top surface of the workpiece. Similarly, spaced a predetermined, closely controlled distance below the bottom surface of the workpiece is a second or bottom cooling plate which has an area that is aligned with and extends over the bottom surface of the workpiece.

A pump arrangement is used to supply the gas coolant to the top and bottom cooling plates under pressure and a damper arrangement is employed to control the mass flow between the top and bottom plates. Associated with the top and bottom cooling plates is a flow straightening arrangement. The top cooling plate has a plurality of first and second apertures for directing substantially columnar jet flows of coolant gas against the thick and thin sections, respectively, at the top surface of the workpiece. The first apertures are sized relative to the second apertures to achieve a higher gas coolant flow to produce substantially equal cooling rates over the thick and thin sections of the workpiece. Similarly, the bottom cooling plate has a plurality of third and fourth apertures for directing substantially columnar jet flows of coolant gas against the thick and thin sections of the workpiece at the bottom surface. The third apertures are sized relative to the fourth apertures to produce substantially equal cooling rates over the thick and thin sections at the bottom surface of the workpiece. Since the workpiece is a plate-like structure having small edge surfaces, the workpiece is uniformly cooled with minimal distortion.

In accordance with another feature of the invention, the workpiece has an extremely thin section when compared to its other sections, and a blocking plate is attached to both top and bottom cooling plates to prevent any columnar jet gas flow from directly impinging the extremely thin section of the workpiece. Gas coolant flow from adjacent workpiece areas which are impinged by the jets is sufficient to produce satisfactory cooling of the extremely thin section of the workpiece.

In accordance with yet another aspect of the invention, the flow straightening means provided in conjunction with the top cooling plate to insure the columnar jet stream flows described above includes a lattice frame or grid which the coolant gas must flow through after exiting the top cooling plate, thus reducing turbulence which would otherwise be present in the quench arrangement disclosed. The flow straightening arrangement in combination with the coolant gas flow mass which may vary anywhere between 400,000–6000,00 SCFH and gas flow velocities may range between 2,000–4,000 ft/min. produces the desired cooling rates at relatively low pressures of 6–9 PSIG.

In accordance with another aspect of the invention, a simple manifold arrangement is used to conduct the gas flow between the top and bottom aperture plate arrangements. In the arrangement disclosed, the gas flow inlet is in direct fluid communication with the top cooling plate and its respective lattice frame. A left and a right hand C-shaped conduit extends, respectively, from the right and left hand ends of the top cooling plate and terminates at a closed end beneath the bottom cooling plate and approximately adjacent the center of the workpiece. The top portion of each C-shaped conduit adjacent its closed end is in fluid communication with the bottom lattice frame. An adjustable damper in at least one of the C-shaped conduits provides an easily regulated mechanism to control the flow of the gas coolant between the top and bottom cooling plates. Further, in conjunction with the manifold arrangement disclosed, the bottom apertured plate comprises a leaf with a plurality of spaced orifices positioned on top of the bottom lattice framework adjacent the closed end of the C-shaped conduit to provide a mechanism for balancing the coolant flow rate over the bottom surface of the workpiece which, as noted above, is correlated to the gas coolant flow rate at the top surface of the workpiece.

In accordance with still another aspect of the invention, a pump arrangement is disclosed which provides an "instantaneous" flow of a sufficient mass of gas coolant to the top and bottom cooling plates when the system is turned on. The pump arrangement includes an outlet in the closed chamber in fluid communication with an exhaust conduit containing a first heat exchanger which in turn is in fluid communication with a pump. The outlet of the pump is in turn in fluid communication with a return conduit containing a valve and a fixed venturi and a recirculating conduit between the inlet and outlet end of the pump. A valve in the recirculating conduit controls the flow of coolant gas in the return conduit providing full flow when in a closed "off" position while the valve in the return line is in an open position. A motor-valve controlled, normally closed bypass line is in fluid communication with the outlet end of the pump and the recirculating conduit to permit the pump to achieve a given velocity of mass flow of coolant gas in the start-up mode through the recirculating conduit which can be instantaneously valved into the return conduit to permit a high velocity and high mass flow of gas to be initially applied to the top and bottom cooling plates. Additionally, a bleed conduit with an adjustable orifice is provided between the pump outlet and the recirculating conduit to provide system pressure control. The closed loop pump arrangement thus permits the use of a protective heat treat atmosphere in the closed chamber which preferably is an inert gas, nitrogen, at ambient or room temperature to cool the workpiece.

Thus, another object of the invention is to provide a high velocity jet impingement cooling arrangement which varies the coolant gas flow impinging the work, pursuant to the configuration of the work, to achieve substantially uniform cooling of the entire workpiece.

It is another object of the invention to provide a gas flow orifice arrangement which permits high speed, non-decaying columnar jet stream impingement to cool the work.

It is yet another object of the invention to provide in a gas quenching arrangement, a manifold arrangement which is easily constructed and simple to operate to control the flow of coolant gas to the workpiece.

Still another object of the subject invention is to provide an easily controlled pump arrangement which can supply a large volume of inert cooling gas at high velocity to the workpiece.

Yet another object of the invention is to provide an improved method of heat treating workpieces which permit complicated structures to be manufactured as unitary or integral workpieces.

Still another object of the invention is to provide a method and apparatus for cooling a workpiece which does not significantly deform the workpiece.

It is still another object of the invention to provide a stable, counterbalanced gas coolant arrangement for high speed cooling of a workpiece.

Yet still another object of the invention is to provide a simple, inexpensive structure which permits the use of a gas coolant at room temperature to quench a workpiece.

The invention may take physical form in certain parts and arrangement of parts the preferred embodiment of which will be described in detail herein and illustrated in the accompanying drawings which form a part hereof and wherein:

DESCRIPTION OF THE DRAWINGS

FIG. 6 is an isothermal transformation curve of a super alloy steel representative of the workpiece with the critical cooling curve achieved by the subject invention superimposed thereon;

FIG. 7 is a graph showing the distortion of a workpiece in the N-S and E-W direction after being heat treated in accordance with the present invention;

DETAILED DESCRIPTION

Figure 1:
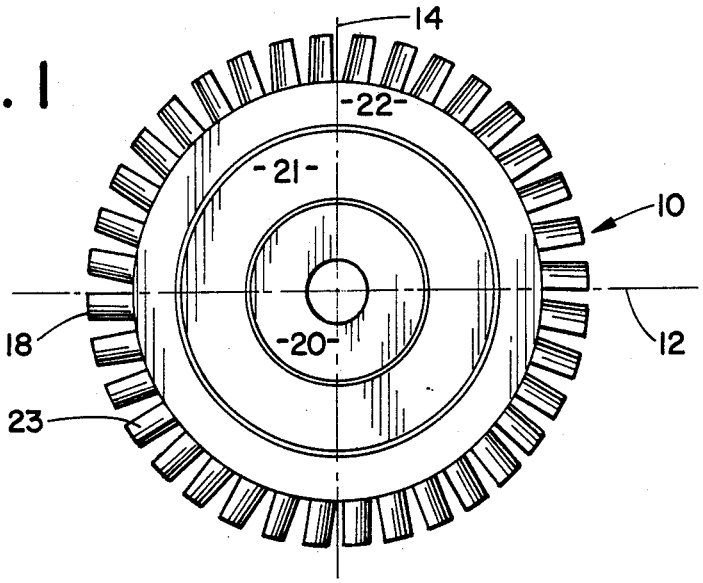
FIG. 1 is a top plan view of the workpiece which is to be heat treated in accordance with the invention.
Figure 2:
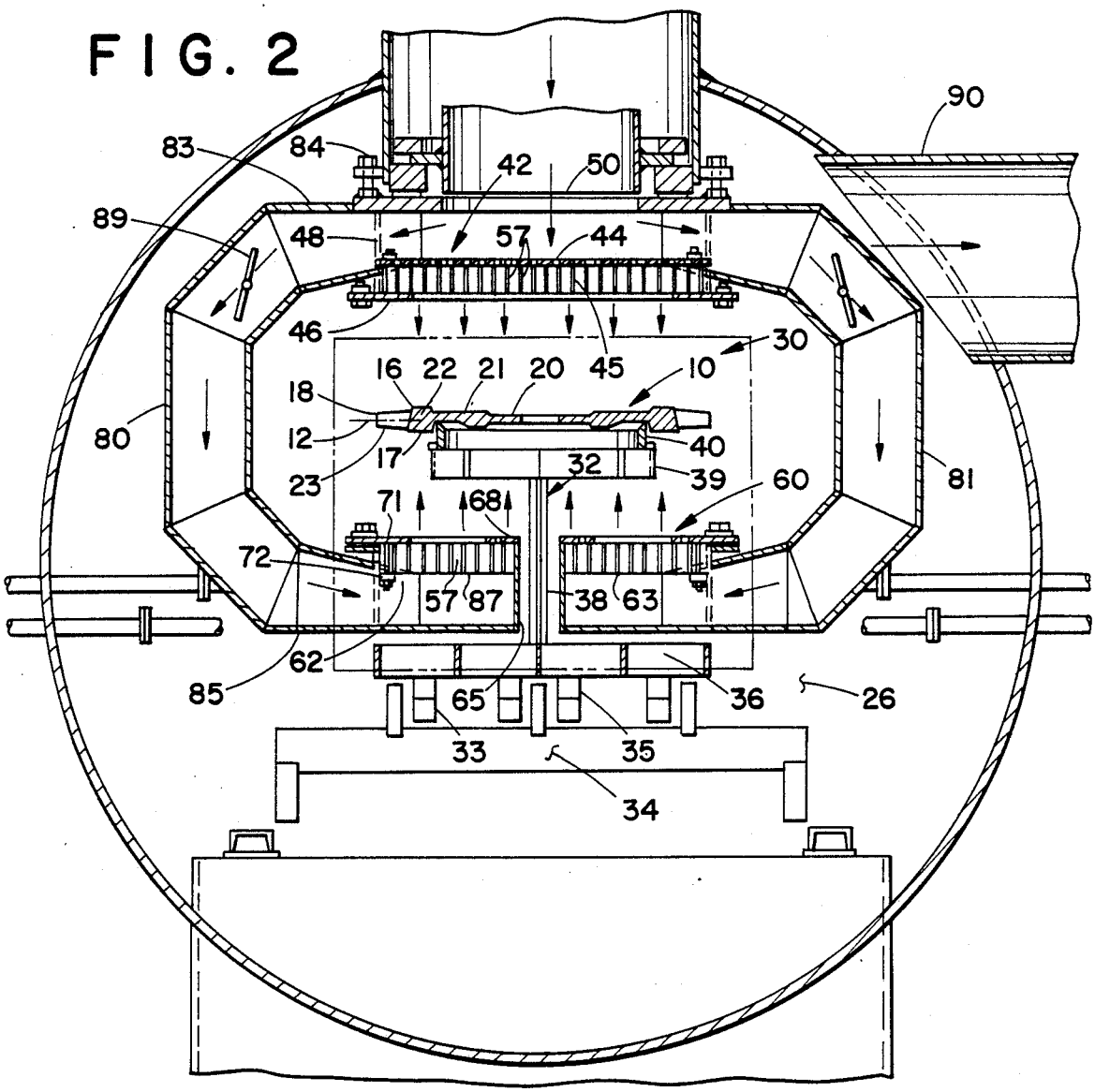
FIG. 2 is a cross-sectional, elevational view of the cooling chamber of a vacuum furnace showing the workpiece and the arrangement used to cool the work in accordance with the invention.

Referring now to the drawings wherein the showings are for the purpose of illustrating a preferred embodiment of the invention only and not for the purpose of limiting same, there is shown in FIGS. 1 and 2 a workpiece 10 which, in the preferred embodiment in the invention, is an integrally-bladed rotor ("IBR") for use in small, high performance gas turbine engines for the aerospace industry. Workpiece 10 is forged and hipped and extruded as one piece in a hot isostatic pressing and the fins or blades thereof are extensions of the body. The composition of workpiece 10 is a nickel-base superalloy more specifically designated IN-100. This superalloy steel is a high volume fraction gamma prime strengthened P/M nickel-base superalloy steel which contains cobalt and molybdenum for solid solution strengthening and zirconium and boron for grain boundary stabilization purposes. The nickel-base superalloy also contains chromium primarily for oxidation resistance. In the fully heat treated condition, the alloy contains a tri-modal, gamma prime (intermetallic precipitate, $Ni_3$ (A1, Ti).

For definitional purposes, workpiece 10 has longitudinally extending or East/West axis 12 and a laterally extending or North/South axis 14 perpendicular to longitudinally extending axis 12 and which will appear as a point in FIG. 2. Since the workpiece shown is relatively thin, the deformation which the cooling apparatus disclosed seeks to minimize is a two dimensional deformation occurring along the East/West and North-/South axes 12, 14 or that which occurs in typically designated X-Y directions. Workpiece 10 is further defined by a top surface 16, a bottom surface 17, and a side or edge surface 18 defining, in essence, the periphery of workpiece 10. The configuration of workpiece 10 may be further characterized as including various thick-thin or cross-sectional profiles extending between top and bottom surfaces 16 and 17 over various longitudinally and laterally extending portions 12, 14 of the workpiece 10. For the rotor of workpiece 10 disclosed in FIGS. 1 and 2 there is shown a first or relatively thin circular bore section 20 which in turn has a thicker intermediate ring-shaped web section 21 extending thereabouts and a still thicker ring-shaped rim section 22 circumscribing the web section 21 and finally, a very thin blade section 23 which comprise the rotor fins and which were heretofore required to be separately welded to rim section 22.

Referring now to FIG. 2 there is shown a cooling chamber 26 which houses the quenching arrangement 30 of the subject invention. Cooling chamber 26 is a standard chamber of a conventional two chamber vacuum furnace. In a two chamber vacuum furnace the heating chamber is located rearward of the cooling chamber 26. A door at the front of cooling chamber 26 permits the work to be loaded into cooling chamber 26 and from thence into the heating chamber, the two chambers then being sealed by a door shown by the dotted line in FIG. 2 so that work can be cooled in the cooling chamber 26 while it is being heated in the heating chamber. To provide as clean an atmosphere as possible, electric heating elements are used in the heating chamber and cooling chamber 26 is, of course, sealed chamber.

The work support arrangement indicated generally at 32 rests on a furnace hearth 33 which in turn rests on framework structure 34 supported within the furnace. A suitable skid arrangement 35 or roller bearing arrangement is used to transfer work support arrangement 32 from cooling chamber 26 to the heating chamber and back. The work support arrangement 32 includes a rectangular grid 36 resting on furnace hearth 33 at one side and supporting a columnar member 38 extending from the center of the opposite side of the grid. Columnar member 38 in turn is affixed to an X-shaped member 39 which in turn carries work support member 40. Work support member 40 is a ring-shaped member making either a knife edge or flat line contact with the intermediate section 21 of workpiece 10. Additional supports may be supplied should there be drooping of the workpiece during the time the workpiece is either heated or cooled.

Figure 4:
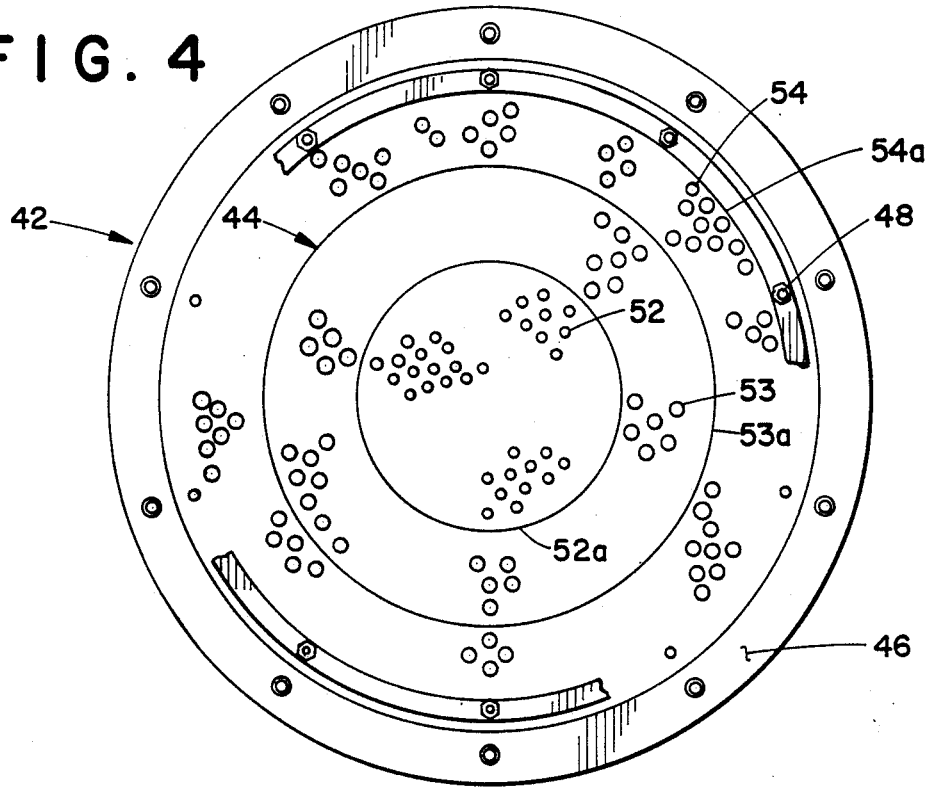
FIG. 4 and 5 are top views illustrating the cooling plates of the present invention.

Referring now to FIGS. 2 and 4, there is shown a top cooling plate arrangement 42 which is positioned a fixed, predetermined distance from top surface 16 of workpiece 10. Top cooling plate arrangement 42 includes a top cooling plate 44, a flow straightening lattice frame 45, a ring-shaped blocking plate member 46, and a bolt arrangement 48 fixing top cooling plate 44 to lattice frame 45 and lattice frame 45 to ring-shaped blocking plate 46. The top cooling plate 44 is adjacent inlet conduit 50 and is a flat circular plate shown in FIG. 4 to have a first plurality of substantially uniformly spaced apertures or orifices 52 arranged within a centrally located circular area 52*a*, a second plurality of substantially uniformly spaced apertures or orifices 53 of larger diameter than the openings of the first plurality 52 arranged in an intermediate ring-shaped area 53*a* concentric and surrounding first circular area 52*a*. Finally, there is a third plurality of substantially uniformly spaced apertures or orifices 54 of size or diameter at least equal to the first plurality of orifices 52 arranged in a ring-shaped area 54*a* concentric with surrounding ring-shaped area 53*a*. The orientation of top cooling plate 44 with respect to workpiece 10 is such that the first plurality of orifices 52 are aligned with and extend over the base section 20 of workpiece 10 and the second plurality of apertures 53 are aligned with and extend over the web section 21 of the workpiece and the third plurality of openings 54 are aligned with and extend over the rim section 22 and blade section 23 of workpiece 10. The lattice frame 45 which is adjacent top cooling plate 44 is a grid work forming a plurality of rectangular or square shaped flow straightening pockets 57. The depth of each pocket is such to insure the straightening of gas coolant flow as will be hereafter explained. Ring-shaped blocking plate 46 is affixed to the opposite end of lattice frame 45 and is sized to extend or encircle or cover the blade section 23 of workpiece 10. It should be noted that ring-shaped blocking plate 46 prevents the flow of gas coolant through third plurality of apertures 54 and lattice frame 45 to directly impinge blade section 23 of workpiece 10.

Figure 5:
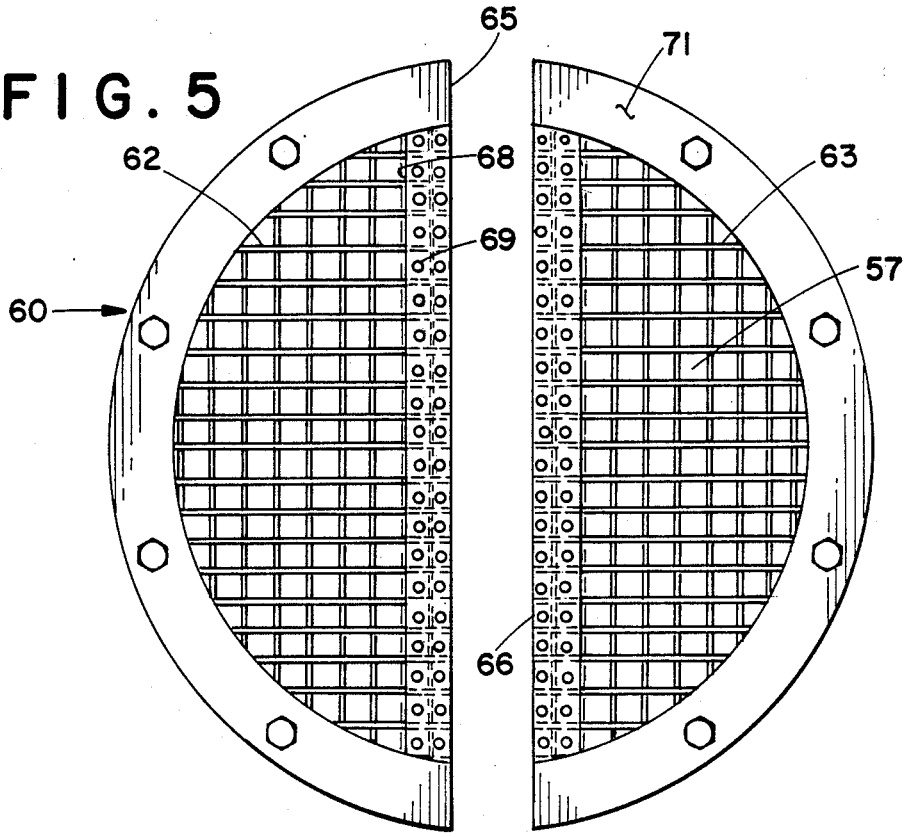

A bottom cooling plate arrangement 60 is shown in FIGS. 2 and 5 for directing streams of gas coolant against bottom surface 17 of workpiece 10. The bottom cooling plate arrangement 60 includes semi-circular left and right hand lattice frames 62, 63 respectively. Left hand lattice frame 62 is spaced from right hand lattice frame 63 a fixed distance to accommodate work support columnar member 38. If the left hand lattice frame 62 was joined with the right hand lattice frame 63, a grid similar to lattice frame 45 would result. Thus, both left hand and right hand lattice frames 62, 63 result in a plurality of square shaped or rectangular flow straightening passages 57 of given depth. At each end 65, 66 of left hand and right hand lattice frames 62, 63, respectively, adjacent work support columnar member 38 and positioned on top of left hand and right hand lattice frames 62, 63 is a laterally extending flat leaf plate 68 having a plurality of apertures or orifices 69 of a predetermined size or diameter. Ideally, leaf 68 could be located on the bottom surface of left and right hand lattice frames 62, 63 although it has been determined that the cooling arrangement of the subject invention does adequately function with leaf plates 68 positioned as shown. Finally, the bottom aperture flow arrangement 60 also includes a bottom ring-shaped blocking plate 71 similar to top ring-shaped blocking plate 46 in shape and function and secured by bolt arrangement 72.

Apertures 69 are uniformly spaced about leaf plate 68 and centrally positioned with respect to flow straightening passages 57 to produce jet streams which impinge substantially most of the area of bore section 20. Orifices 69 also extend into various portions of web and rim sections 21, 22, for reasons which will be hereafter explained. Flow straightening passages 57 are directly aligned with and extend over that portion of web and rim sections 21, 22 which are not contacted by orifices 69 and provide a plurality of uniformly spaced apertures for directing gas coolant flow against web and rim sections 21, 22.

Top cooling plate arrangement 42 is in fluid communication with the bottom cooling plate arrangement 60 by means of a left hand C-shaped manifold 80 and a right hand C-shaped manifold 81 and like numbers will refer to like parts when describing manifolds 80, 81. Each manifold has an open top end portion 83 and a closed bottom end portion 85. Top end portion 83 is secured by a bolt arrangement 84 to inlet conduit 50 and bolt arrangement 84 also includes bolt arrangement 48 for securing top cooling plate arrangement 42. The closed bottom end portion 85 of each manifold 80, 81 is coterminous with left and right hand lattice frame ends 65, 66 and bottom cooling plate arrangement 60 is secured to manifold bottom end portion 85 by bolt arrangement 72. Manifold bottom end portion 85 is open at its top surface 87 to be in fluid communication with the left hand and right hand lattice frames 62,63. A motor operated damper 89 is placed within each C-shaped manifold 80, 81 to control the flow of coolant gas between the top cooling plate arrangement 42 and the bottom cooling plate arrangement 60.

Figure 3:
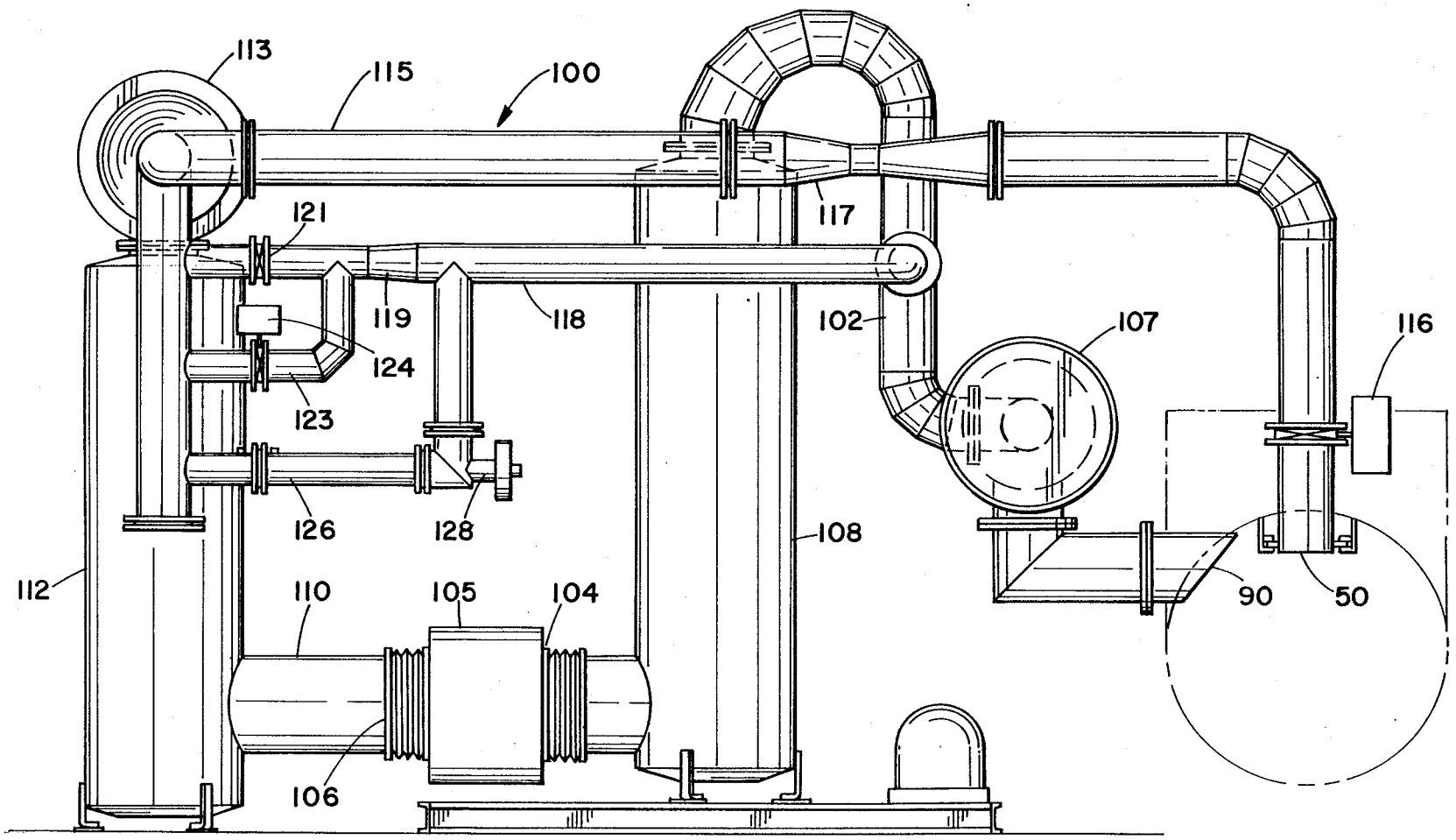
FIG. 3 is a side elevation view schematically illustrating the pump arrangement used to supply coolant gas to the cooling arrangement shown in FIG. 2.

Referring now to FIG. 3, there is shown a pump arrangement 100 which receives spent intake coolant from an outlet 90 of cooling chamber 26, regenerates the coolant, and returns fresh gas coolant to inlet conduit 50 of cooling chamber 26. More specifically, an exhaust conduit 102 is in fluid communication at one end with exhaust outlet 90 and at its other end with the inlet end 104 of a pump 105. Interposed within exhaust conduit 102 is a first heat exchanger 107 and a silencer 108 adjacent the inlet end 104 of pump 105. Adjacent first heat exchanger 107 but not shown, is an inlet for purposes of supplying an inert gas such as nitrogen to the closed system from a supply tank (not shown) which is pressurized at 6 to 9 psi. At the outlet end 106 of pump 105 is a branch conduit 110 which contains a discharge silencer 112 and a second heat exchanger 113. In fluid communication with second heat exchanger 113 is a return conduit 115 which terminates at the inlet 50 of cooling chamber 26. Within return conduit 115 is a fixed venturi shown at 117 which is oriented to increase the flow of the gas coolant on the downstream side thereof and a motorized on/off valve 116 adjacent the inlet end 50 of cooling chamber 26. In fluid communication at one end with second heat exchanger 113 and branch conduit 110 is a recirculating loop conduit 118 which is in fluid communication at its opposite end with exhaust conduit 102. Recirculating loop conduit 118 increases in diameter from eight inches adjacent branch conduit 110 to ten inches adjacent exhaust conduit 102 to provide a venturi effect at the transformation portion of the conduit designated at 119. A manually adjustable valve 121 is provided in the recirculating loop conduit 118 adjacent the end thereof and in fluid communication with branch conduit 110. A start-up loop conduit 123 in fluid communication at one end with branch conduit 110 and at its other end with the smaller diameter portion of recirculating loop 118 upstream of the transformation venturi effect portion 119 is provided and a motorized valve 124 within start-up loop conduit 123 controls the flow of gas coolant therethrough. In addition, a bleed-off conduit 126 is provided in fluid communication at one end with branch conduit 110 downstream of second heat exchanger 113 and in fluid communication at its other end with the larger diameter portion of recirculating loop conduit 118 downstream of transformation venturi portion 119. Within bleed-off conduit 126, there is provided a variable orifice controlled by safety valve 128 operable to bleed a portion of the coolant gas to a reservoir (not shown) or a stack to insure that the pressure of the system does not exceed a predetermined limit.

When the pump arrangement 100 is in its full operational mode to cool the work and with manually adjustable valve 121 in a closed position and motorized valve 116 in an open position, spent coolant gas exits outlet 90 into exhaust conduit 102 whereat the gas is cooled by first heat exchanger 107, muffled at inlet silencer 108, compressed by pump 106, further muffled by discharge silencer 102, further cooled by second heat exchanger 113. From second heat exchanger 113 the fresh cooling gas returns to inlet end 50 with a boost in velocity through venturi 117 passing through open motorized valve 116. The velocity of the flow through return conduit 115 is controlled by the degree that manually adjustable valve 121 is open to permit flow through circulating loop conduit 118. In the full operation mode, motorized valve 124 is closed and the safety valve is operable to provide a bleed-off if excess pressure should occur. To achieve start-up of the pump arrangement, the motorized valve 116 is closed, the entire system is under six to nine pounds psi pressure with an inert gas at ambient temperature supplied by the gas coolant reservoir (not shown), and motorized valve 124 in the start-up loop 123 is open. The pump 105 operates to compress the gas coolant which travels through the start-up loop conduit 123 through the recirculating loop conduit 118 back to the inlet end 104 of the pump. In this manner, a large mass of coolant gas at full velocity is instantly available to top and bottom cooling plate arrangement 42, 60 when motorized valve 116 is open at which time start-up loop motorized valve 124 is closed. It is believed critical to the heat treat process to provide an instant source of coolant fluid, and while the pressure of the jet streams is not excessive, the pressure must be uniformly applied to both top and bottom surfaces 16, 17 to stabilize workpiece 10.

Operation

The invention will now be explained with reference to its cooling characteristics. As noted above, workpiece 10 is formed by a forging operation with integral rotor fins. To provide a desired hardness and yield and tensile strength to workpiece 10, workpiece 10 is first heated under vacuum to its critical temperature which for the superalloy steel under consideration has been determined as 2065° F.±15° F. It is allowed to soak at this temperature for as long as two hours to assure through heating and full conversion to gamma prime solution. The workpiece is then transferred to cooling chamber 26 whereat quenching is to begin within twenty seconds. When accurately positioned between top operational flow arrangement 42 and bottom operational flow arrangement 60, inlet valve 116 is opened and gas coolant immediately begins to cool workpiece 10. The rate of cooling must be sufficient to clear the "knee" of the T-T-T or isothermal transformation curve without permitting any significant portion of the workpiece to pass through the "knee" of the curve. The process as thus described is diagrammatically shown in FIG. 6 where a typical superalloy T-T-T curve is drawn with the cooling rate achieved by the present invention with the workpiece disclosed herein superimposed on the curve. After clearing the "knee" of the T-T-T curve, and reaching the critical temperature, which is approximately 1200° F., the cooling process can be stopped since there is no significant metallurgical change. However, in practice the work is cooled to at least 250° F. and preferably to ambient temperature for handling convenience. Thereafter, the workpiece is subjected to precipitation hardening, stabilization and aging in accordance with standard heat treat procedures.

In accordance with known deformation theories the cooling rate must be sufficient to clear the "knee" of the T-T-T curve to avoid different grain growth between various portions of the workpiece which will result in work deformation. On the other hand, if the workpiece is quenched drastically, quench cracks will occur. Thus one of the process objectives is to cool all the surfaces of the workpiece at a rate which is just sufficient to meet the critical cooling rate of the workpiece thus resulting in a uniform grain growth without significant distortion or cracking of the workpiece. This objective is particularly difficult to achieve when the workpiece is composed of several thick-thin sections, which, as noted above, rule out liquid quench arrangements because of vapor barrier considerations.

It has long been known that the temperature of the workpiece can be accurately controlled by air cooling. Recently, in the heat treating field and particularly in combination with vacuum furnaces, various super cooling gas arrangements have been employed. These arrangements use jet streams at high velocity to impinge the workpiece. The jet streams operate at a flow rate of 3,000 to 3,500 SCFM and achieve cooling rates for tool steels of about 250 lbs. at 90° F./min. The cooling arrangement of this invention utilizes mass flow rates of 6,000 to 10,000 SCFH (400,000 to 600,000 SCFH) and achieve cooling rates in the order of 200° F./min to 400° F./min, depending on the thickness of the workpiece.

Figure 9:
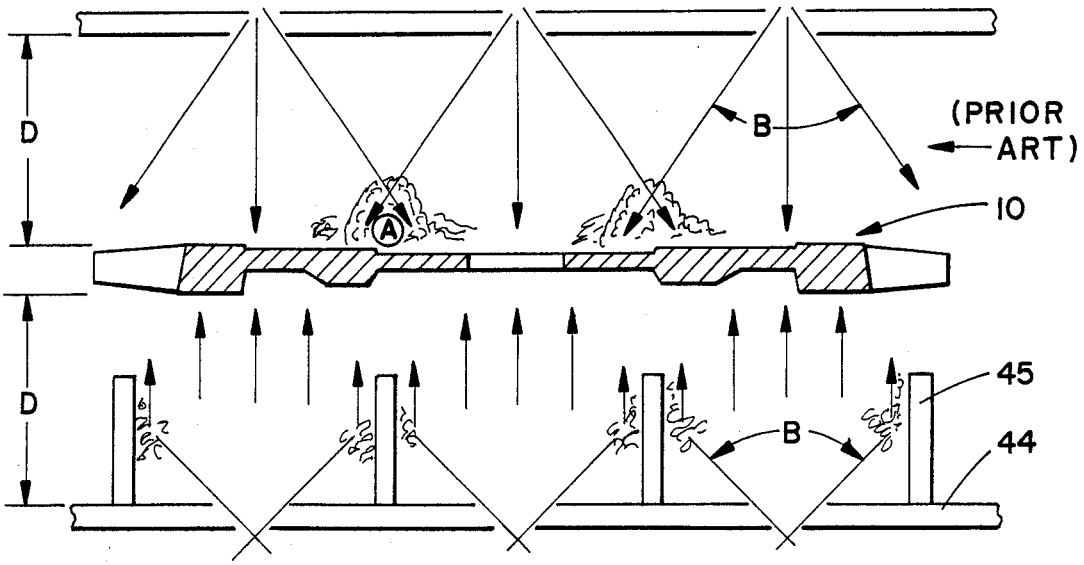

The increased cooling rates achieved in the present invention are believed attributable to the improved heat transfer characteristics of the jets disclosed. More particularly with respect to the top cooling plate arrangement 42, the gas coolant from inlet conduit 50 impinges top cooling plate 44 and passes through the first, second and third orifices and assumes the typical fan shaped jet distribution pattern with the included angle of the fan jet determined by the pressure drop across the orifices in accordance with the conventional flow formula set forth below:

$$\Delta P = e\frac{V^2}{2gc}$$

Where $\Delta P$ is the pressure drop $V^2$ is the gas velocity e is the gas density gc is the acceleration due to gravity—i.e. 32.17 ft/sec.$^2$ In a conventional fan jet cooling arrangement, as shown in FIG. 9, adjacent jets would intersect one another to provide a turbulent zone A slightly spaced from the work thus diminishing the effectiveness of the jet cooling. The lattice frame 45 straightens the fan pattern to significantly reduce the turbulent zone A and enhance the effectiveness of the cooling. This is believed to be the reasons why the present invention achieves a higher cooling rate than that which would otherwise result by simply increasing the velocity of the cooling gas through the apertures although the pressure of the jets against the workpiece is minimized at about 6–9 psig.

For a given orifice size the included angle of the fan jet shown as B in FIG. 9 is a function of the velocity, mass flow and density of the gas coolant. In the manifold arrangements 91, 81 bottom end 85 is closed creating a significant turbulent zone of high pressure at that region. The high pressure coupled with the turbulence in this area is sufficient to achieve high cooling rates by reversing the parts between the top cooling plate arrangement 42 and the bottom cooling plate arrangement 60, that is by fixing the leaf plates 68 on top of the lattice frames 62, 63. The lattice frames 62, 63 adjacent manifold end portion 85 act to straighten and direct the turbulent flow into the leaf plates aperture 69 which was found to have sufficient velocity to maintain a minimum included angle B to provide sufficient cooling not only at the bottom surface 17 of thin bore section 20, but also at the center portions of web and rim sections 21, 22. If the velocity were diminished, or if bore section 20 were thicker, a lattice frame 62, 63 would also be placed on top of leaf plate 68. To achieve the proper counterbalanced cooling at the bottom surface 17 of workpiece 10, and considering the pressure drop and turbulence resulting at manifold end portions 85 each lattice frame 62, 63 may be considered the equivalent of the second and third aperture pluralities 52, 53 of top cooling plate 44.

It could be concluded that the bottom cooling plate arrangement 60 is different from the top cooling plate arrangement 42 because of the configuration of the manifolds 80, 81 and that this could be obviated by constructing a "Y" branch arrangement. In practice the gas coolant flow between the top and bottom surfaces 16, 17 of the workpiece 10 must be independently adjustable and a "Y" branch manifold would require the additional placement of a damper in one of the "legs" of the "Y" to achieve this control. The C-shaped manifolds 81, 82 avoid the need for an additional damper which must be independently controlled.

In the preferred embodiment disclosed, the rotor workpiece 10 has a weight of approximately 110 lbs., and an outside hub diameter of 24". The sizes of the first plurality of orifices 52 are 3/32", the second plurality of orifices 53 are 7/32", and the third plurality of orifices 54 are 3/32". The orifices 69 in leaf plates 68 are 3/16". The lattice frames 45, 62, 63 form squares which are 1" by 1" with a depth of 2'. The distance "D" as designated in FIG. 9 is approximately 6'.

Figure 8:
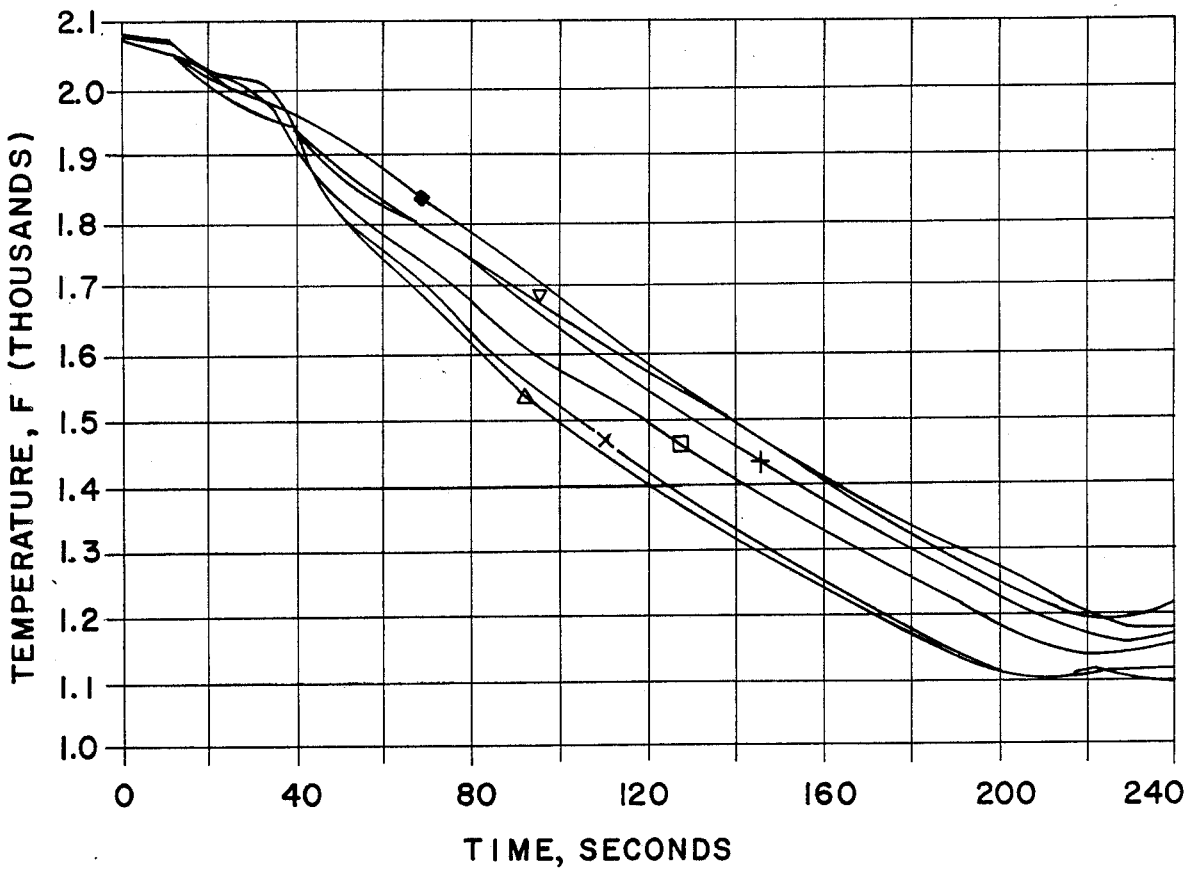
FIG. 8 is a graph illustrating the cooling rates obtained at various portions of the workpiece when quenched in accordance with the present invention; and, FIG. 9 is a schematic illustration of the jet cooling streams achieved in the present invention compared to the jet streams of prior art cooling arrangements.

Rotor workpieces 10 cooled in accordance with the invention disclosed were measured for deformation along both the E-W (longitudinal axis 12) and N-S (lateral axis 14) directions at both the top and bottom surfaces 16, 17 and at the different thick-thin sections. The worst distortions obtained are plotted in FIG. 7. It is noted that in no case did any portion of the workpiece distort in excess of 0.050'. Similarly, thermocouples were likewise placed about workpiece 10 to obtain the cooling rates of workpiece 10 at various sections. The cooling curves obtained are shown in FIG. 8. Cooling rates in the bore center portion 20 of 260° F./min., and the web and rim sections 21, 22 of 237° F./min. were obtained. Cooling rates of blade section 23 were direct impingement of the coolant gas and was prevented by means of ring-shaped blocking plate 46 recorded at 1160° F./min. Because of the thinness of the fins in blade section 23 and the high velocity uniform flow of the coolant passing therealong from the jet streams in the adjacent sections, no distortion among the fins was observed. Distortion could occur at the junction of the blade section 23 and the hub section 22; however, such distortion, because of the slight material mass was not appreciable and quench cracks did not occur. Importantly, bore section 20 and web and hub sections 21, 22 cooled at approximately the same rate prevented any "bowing" or "dishing" of the sections, which in turn would be magnified at the fins in blade section 23.

The invention has been described with reference to the preferred embodiment. Obviously, modifications and alterations will occur to others upon reading and understanding the specification. It is my intention to include all such modifications and alterations insofar as they come within the scope of the present invention.

It is the essence of the invention to provide a method and apparatus for using a gas coolant to uniformly quench a workpiece, particularly a workpiece having thick-thin sections throughout.

Having thus defined my invention, I claim:

1. A method for quenching a uniformly heated plate shaped workpiece comprising at least a first thick section and a second thin section at a rate substantially equal to at least the critical cooling rate of said workpiece comprising the steps of:

(a) supporting said workpiece in a sealed chamber;

(b) providing a source of gas coolant under pressure to said chamber;

(c) forming from said coolant source first, second, third and fourth pluralities of substantially equally spaced jet streams of gas coolant. said first and second jet streams aligned with said first and second sections, respectively, of said workpiece at one side thereof, said third and fourth jet streams aligned with said first and second sections. respectively, of said workpiece at the opposite side thereof;

(d) straightening each first and second stream by means of a lattice plate to produce a plurality of side-by-side rectilinearly shaped jet streams. each straightened jet stream closely adjacent one another, and impinging said straightened first and second jet streams against said workpiece substantially perpendicular to one side thereof thus enveloping said first and second sections by closely spaced columnar jet streams having a lower coolant mass flow adjacent said second section than said first section;

(e) impinging said third and fourth pluralities of said jet streams substantially perpendicular to the opposite side of said workpiece: and (f) controlling the flow of said jet streams so that said first and second pluralities of jet streams and said third and fourth pluralities of said jet streams cool said first and second workpiece sections at approximately the same rate on each side and also opposite sides of said workpiece whereby the workpiece is quenched without any significant distortion.

2. The method of claim 1, wherein the velocity locity of said gas coolant streams range between 2,000–4,000 ft/min, the mass flow of said coolant source is between 400,000–600,000 SCFH and the pressure of said jet streams are about 6–9 psig.

3. The method of claim 2, wherein the mass flow of said coolant source is between 400,000–600,000 SCFH.

4. The method of claim 1 further including the steps of initially directing said gas coolant source against a top cooling plate situated above said workpiece and subsequently against a bottom cooling plate situated below said workpiece;

controlling the flow of said coolant source from said top plate to said bottom plate, said coolant mass flow through said cooling plates being different; and forming said third jet stream pluralities as free standing jets without any straightening thereof.

5. The method of claim 4 wherein said plate shaped workpiece has a third fin section at the periphery thereof, and including the additional step of orientating said first, second, third and fourth jet streams so as not to impinge against said third section whereby the distortion of said workpiece does not exceed 0.05′.

6. The method of claim 4 wherein said coolant gas is at ambient temperature and said maximum cooling rate is between 200° F./min to 400° F./min.

* * * * *